Nov. 5, 1935.  M. J. WEBER  2,019,751
WEIGHING SCALE
Filed Nov. 18, 1931  3 Sheets-Sheet 3
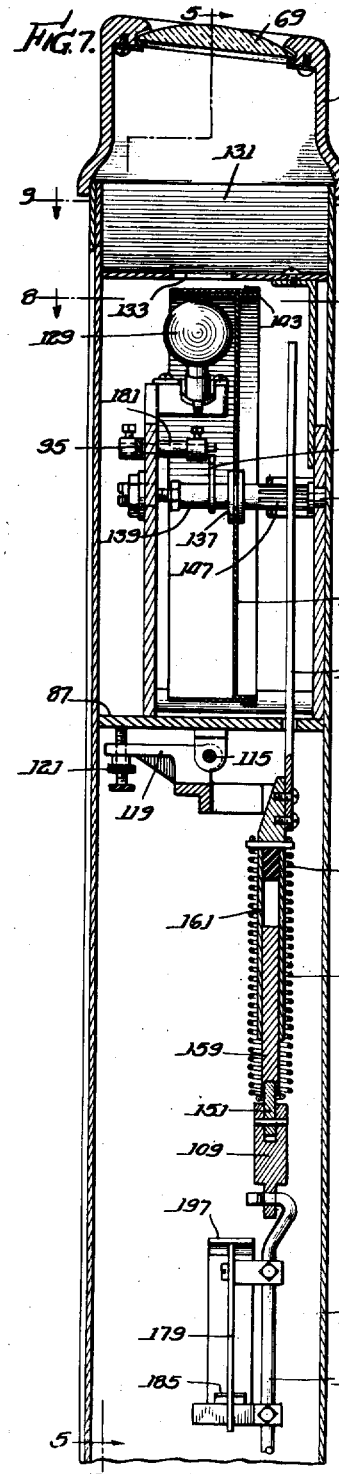
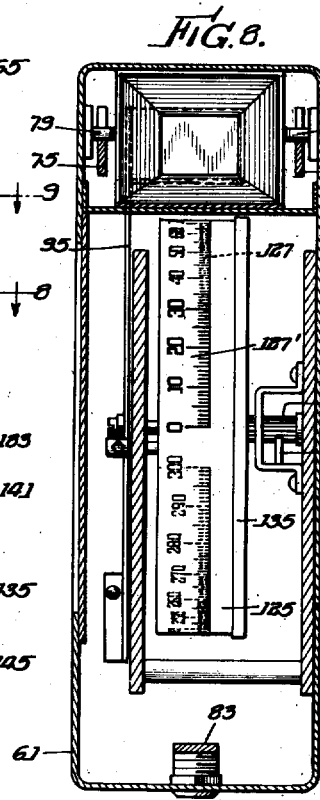
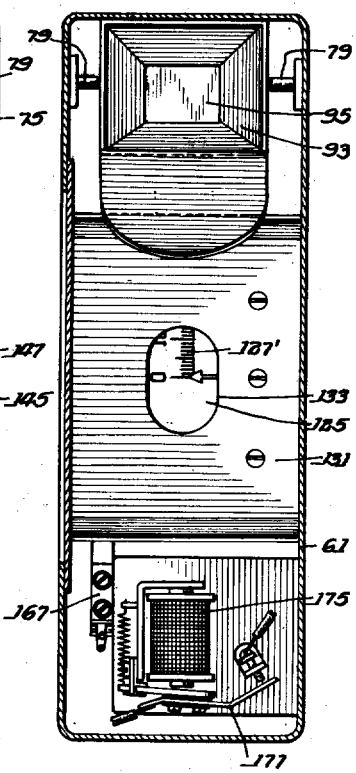
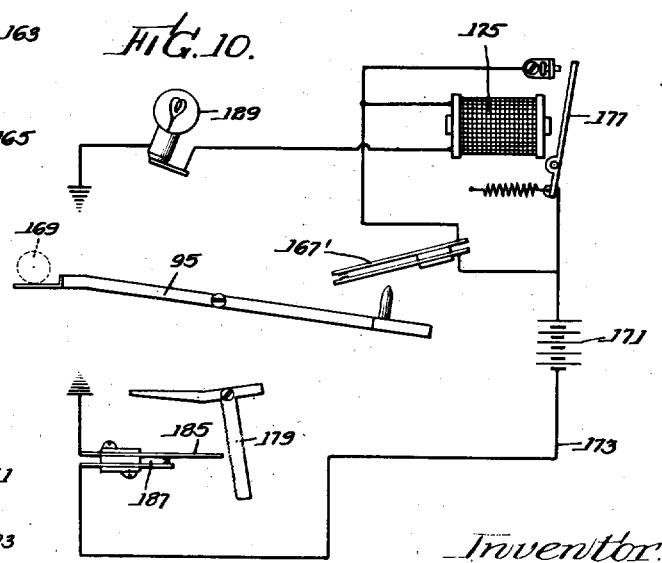
Inventor
Mathias J. Weber,
by Cheever, Cox & Moore att'ys Patented Nov. 5, 1935

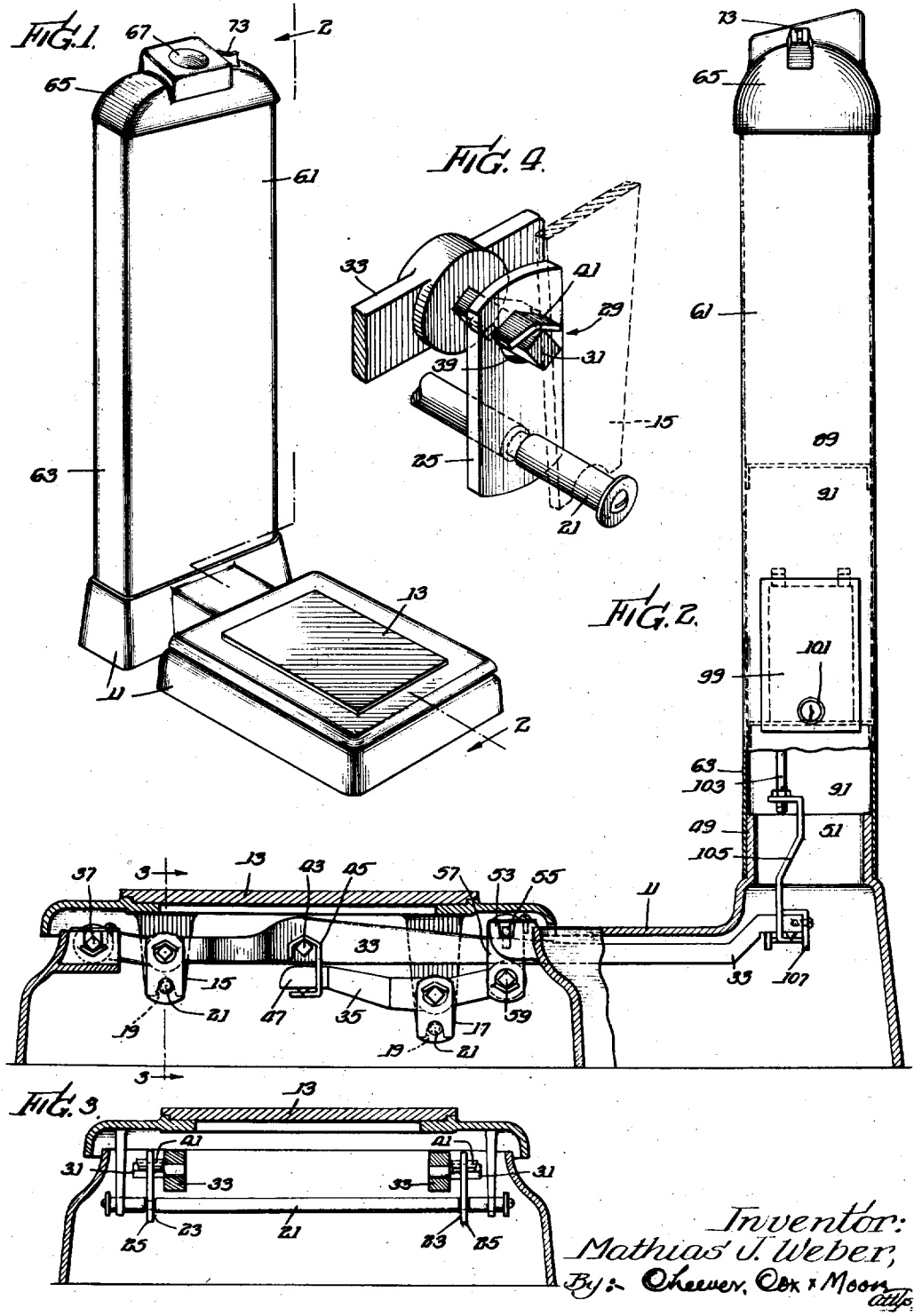

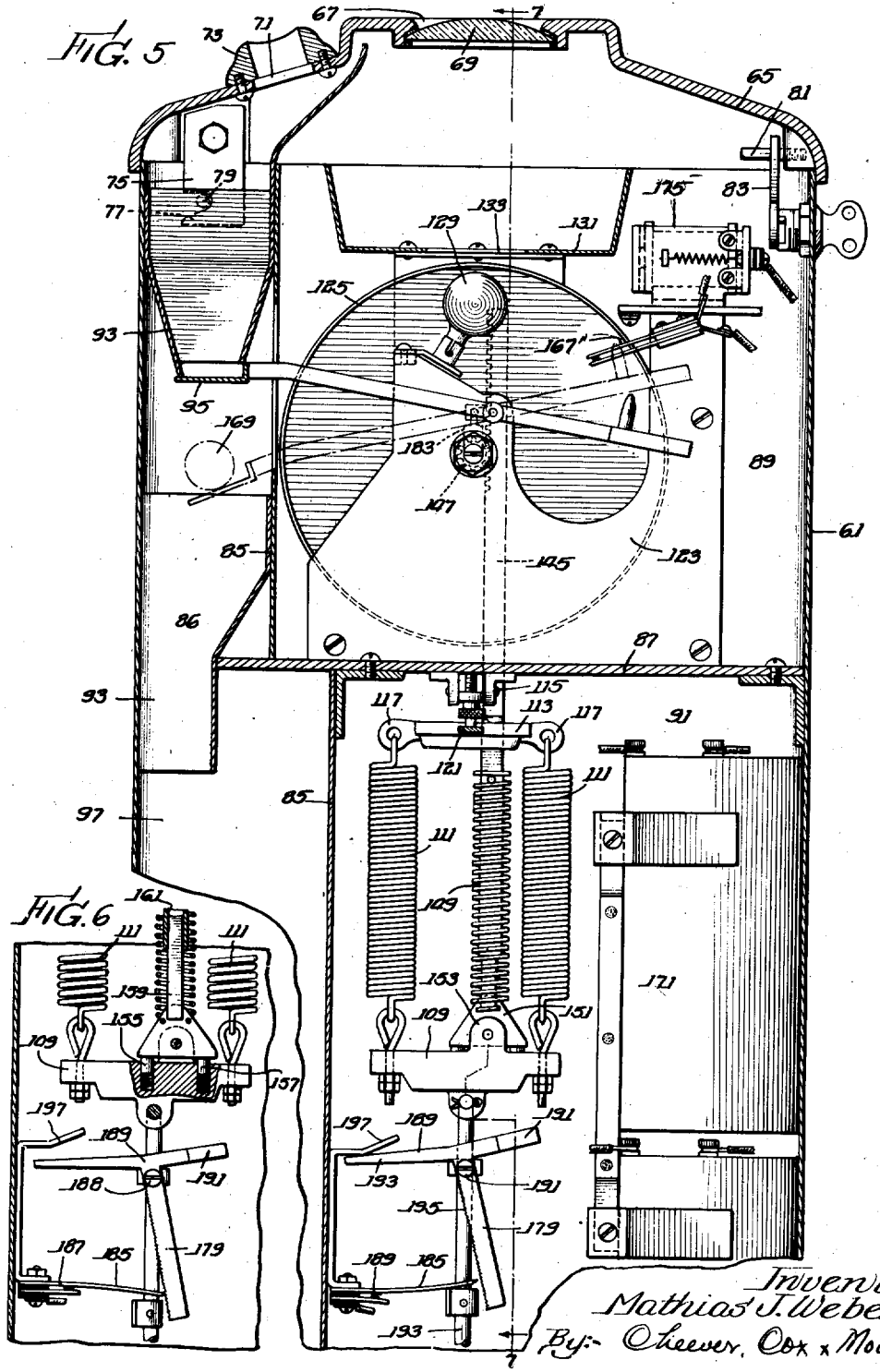

2,019,751

UNITED STATES PATENT OFFICE 2,019,751

WEIGHING SCALE

Mathias J. Weber, Chicago, Ill., assignor to Continental Scale Works, Chicago, Ill., a corporation of Illinois Application November 18, 1931, Serial No. 575,717

19 Claims. (Cl. 194—9)

My invention relates to weighing scales and has more particular reference to a scale of the coin or token control type.

One of the important objects of the invention is to provide a coin controlled weighing scale of unusually simple construction and operation, which is cheap to manufacture and easy to keep in operating condition.

Another important object of the invention is to provide a weighing scale, normally inoperative to disclose the weight registered by the mechanism, which may be conditioned to disclose the registered weight when a token is deposited and a weight is on the scale platform, the scale mechanism being inoperative if either of the two prerequisite conditions, viz: the deposition of a token and the placing of the weight upon the platform, are not met.

Among the other objects of the invention are to provide a scale of the class described in which the pre-requisite conditions, which must be met before the scale will disclose a weight registered by the mechanism, may be performed in any order, that is to say, the subject to be weighed may be first deposited on the scale and the coin or token inserted, or this order of procedure may be reversed without danger that the coin or token will fall through the mechanism before the user of the scale is prepared to note the registered weight.

My present invention further contemplates the provision of means associated with the weight registering mechanism so that the same will be rendered inoperative to disclose the registered weight if an attempt is made to weigh more than one object for each token or coin deposited.

Another important object of the invention is to provide a weighing scale of the class described wherein a translucent member is employed as a part of the weight indicating means of the scale, the translucent member being arranged to hide the weight registered by the scale until illuminated and then to reveal the weight, the illumination of the scale being controlled by the deposition of the coin and by placing the weight on the scale.

Another feature of the invention resides in the construction and arrangement of the dial itself and the mounting thereof in the casing.

Yet another important object is to provide a scale having a translucent dial having a scale for indicating the weight registered by the weighing mechanism, the scale, corresponding to certain weights, being formed on the translucent member in a position to be visible at all times so that the scale may be used without the deposition of a token to weigh light-weight objects, such as packages, and other scale forming indicia arranged on the translucent member so as to be normally invisible and means to render visible the normally invisible portion of the scale whereby heavy weights will not be disclosed unless and until means formed in the weighing mechanism have been actuated to render the normally invisible portions of the scale visible. This feature is important because scales of this general type are used in retail stores, such as drug stores, grocery stores and the like, to serve persons who wish to ascertain their weight in return for the payment of a small coin and the utility of such a scale is enhanced as the same can be made to register the weight of small packages, which the proprietor of the store may desire to determine without depositing a coin.

In scales of the class mentioned, it is also necessary to prevent double weighing, that is to say, the common practice, wherein a coin is deposited and the weight of one user is ascertained and at the same time a second person steps onto the platform before the actuating token has had time to fall through the mechanism and render same inoperative, thus two "weighs" are obtained for the price of one. I have provided an arrangement for substantially preventing the manipulation of the mechanism in this manner.

Another important object is to provide a shockless drive construction to guard the weight registering mechanism from destructive jars and jolts, which might otherwise be transmitted thereto by suddenly dropping a heavy weight on the scale platform.

A further object of the invention is to provide a novel pivot construction for certain of the parts on the weighing mechanism and more particularly those parts that are associated with the scale platform.

Yet another object of the invention, is to provide a scale of the class described wherein the coin control and weight indicating mechanism is contained in a case which may be quickly and easily assembled on and demounted from the base in which the weighing platform and its associated mechanism is arranged. Devices of this general character comprise a relatively low weighing platform portion containing the actuating means for the weighing mechanism and including the platform proper and its supporting levers, and the upstanding portion containing the weight registering and weight indicating means and the like, and the coin control mechanism, in a readily accessible position in order to render the use of the scale convenient; and it is my purpose to form the upstanding housing as a self-contained unit, which may be detached from the mechanism contained in the housing as it is usually the mechanism in the housing that more readily gets out of order. By forming the housing as a separate detachable unit, necessary repairs are facilitated. The device also may be more readily shipped to its designation from the factory.

Yet another object of my invention resides in the provision of a weighing scale which can be used either in daylight, lamplight, or in dark or semi-dark places, and wherein such results are accomplished by utilization of a shiftable translucent scale dial bearing weighing calibrations on its under surface and wherein the dial is shiftably mounted within a closed light-excluding casing having a restricted aperture arranged so that in daylight or lamplight the weighing calibrations will not be visible, and wherein I am enabled to utilize almost minute illuminating means placed immediately to the rear of the shiftable scale dial for illuminating a restricted portion thereof whereby to indicate the registered weight, and by which construction a very small lamp of minimum wattage may be utilized.

Ancillary to this phase of my invention, I am also enabled to provide the front face of the translucent scale dial with a field of weighing calibrations which will be visible through the sight aperture without reference to the utilization of the illuminating means, whereby the weights or persons or objects up to a minimum amount may be viewed without reference to the operation of the illuminating means and/or the operation of the illuminating means by a coin or other token.

Numerous other objects and advantages of the invention will be apparent as the same is more fully understood from the following description, which taken in connection with the accompanying drawings, discloses a preferred embodiment of the invention.

Referring to the drawings:

Figure 1 is a perspective view of a weighing scale embodying my present invention;

Figure 2 is a vertical section taken substantially along the line 2—2 in Figure 1;

Figure 3 is a vertical section taken substantially along the line 3—3 of Figure 4;

Figure 4 is a perspective view of a novel bearing construction embodied in the scale;

Figure 5 is a vertical section taken substantially along the line 5—5 in Figures 3 and 7;

Figure 6 is a fragmentary view of the parts of the weighing mechanism as illustrated in Figure 5;

Figure 7 is a vertical section taken substantially along the line 7—7 in Figure 5;

Figures 8 and 9 are horizontal sections taken substantially and respectively along the lines 8—8 and 9—9 in Figure 7; and Figure 10 is a wiring diagram of electrical connections embodied in the scale.

To illustrate my invention, I have shown on the drawings, a scale comprising a relatively low housing 11 forming a base in which is mounted a scale platform 13, the scale platform being carried on a train of levers. The scale platform is provided with front, relatively short, downwardly extending legs 15 and rear, spaced-apart, relatively long, downwardly extending legs 17. The legs 15 and 17 are provided with downwardly facing grooves 19 which rest upon transverse rods 21, there being a rod between the front pair of legs 15 and another rod between the rear legs 17. The rods 21, near their ends, are provided with restricted or necked portions 23, which are journaled in the links 25. These links, in turn, are swung by means of a novel pivot construction 29 from stub axles 31 formed on the levers 33 and 35.

The platform is thus supported on the rods 21, which in turn are swung by means of the links 25 from the levers 33 and 35, the forward portion of the platform being supported on the spaced levers 33, while the rearward portions of the platform are supported from spaced levers 35. The levers 33 extend in spaced relationship from front to rear of the casing 11, each being fulcrumed in a pivot 37, which is formed by providing the ends of the levers 33 with an outstanding rectangular stub shaft and cradling one edge of the rectangular shaft in a V-shaped notch formed in the casing 11, the V-shaped notch comprising pieces forming intersecting surfaces welded into a part detachably mounted in a seat formed in the housing 11. Rearwardly of the pivot 37, each lever 33 carries an outwardly extending stub shaft 31 on which the links 35 are swung. These links 35 are provided with a perforation 39, through which the shaft 31 extends and a strip 41 of substantially V-shaped, cross-section is fastened through the perforation 39 in each link in a position to open downwardly in the upper portions of the perforation 39 so that one edge of the rectangular shaft 31 will form a knife edge contact with the member 41, the bearing edge of the stub shaft 31 being directed behind the inclination of the sides of the V-shaped member to center the shaft with respect to the link 25 whereby the pivot is rendered substantially self-aligning.

This involves substantially the same principle in placing the pivots 37 at the front ends of the levers 33. Rearwardly of the pivots 29, the lever is provided with outwardly extending stop shafts 43 from which are swung stirrups 45. These stirrups receive the forward ends 47 of the levers 35. The levers 33 extend rearwardly of the pivot 43 into a restricted portion of the casing 11, which is provided with an upstanding flange 49 defining an upwardly opening aperture 51 above the inner ends of the levers 33.

The levers 35 are pivotally supported at the rearward ends from the rearmost portions of the casing 11, the casing being provided with a support 53 to receive pinthals 55 formed at the upper ends of swinging links 57, the lower portions of which are provided with perforations and means forming inclined troughs similar to the perforations 39 and troughs 41 formed in the links 25.

The perforation and trough of the link 57 are adapted to receive a rectangular stub shaft 59 formed at the rearmost ends of the levers 35 so that the lever 35 is pivotally and swingingly supported with respect to the base 11. The intermediate portions of the lever 35 swingingly carry the rearmost legs 17 of the weighing platform by a mechanism similar to that heretofore described in connection with the support of the weighing platform from the lever 33.

When the weight is placed upon the weighing platform, the system of levers and links heretofore described will be shifted and the ends of the levers 35, which are disposed beneath the opening 51 of the base 11, will be displaced and this movement will be transmitted to the weight indicating and weight measuring mechanism contained in a casing 61, which is supported on the base of the opening 51 thereof.

The casing 61 may be formed in any suitable or preferred manner and preferably comprises side walls 63 formed of sheet metal suitably configurated in any desired artistic manner and a cap 65, which is preferably formed as a casting, is carried at the upper end of the side walls, which in turn are mounted on the base 11, the lower portions of the side walls being adapted to embrace the upstanding flange 49, which is received within the lower end of the sheet metal sheath. The cap 65 provides a peep hole 67, which is or may be provided with a magnifying lens 69 so that the weight recording mechanism, inside of the casing, may be viewed by anyone looking through the peep hole. The cap also is provided with a coin aperture 71 and a guide collar 73 for receiving the coin and directing it through the aperture and into the casing. The cap is also provided, at one end, with a lug or lugs 75 having hooked portions 77 adapted to be hooked upon pins 79 mounted in the casing walls 63 near the upper end thereof.

The lug 75 and pins 79 are mounted respectively on the inner walls of the cap and casing so that after the cap is in place, the lugs cannot be tampered with by unauthorized persons.

In order to secure the cap on the casing, it is provided, at a point remote from the lug and preferably at the opposite end of the cap, with a pin 81 and the casing carries a rotatable hook member 83, which is adapted to co-operate with the pin to form a means to fasten the cap in place, the rotation of the hook 83 being key controllable from outside of the casing. In this manner, after the cap is locked in position, unauthorized tampering by anyone other than a person holding the key for controlling the member 83 is prevented.

Within the casing 63, partition means 85 are provided to define a coin compartment 86, and an adjacent compartment for containing the weight measuring and registering mechanism. A horizontal partition 87 is also provided to further subdivide the weighing mechanism compartment into an upper chamber 89 for containing the weight registering dials and a lower chamber 91 for the weighing mechanism proper.

The coin compartment includes chute forming means 93 for receiving the coin deposited through the slot 71 and directing it sequentially to a switch operating lever 95 and thence into a coin receptacle 97, from which the coins may be removed from the device through a door 99, which is provided with a lock 101. The weighing mechanism comprises a rod 103, which extends substantially vertically in the compartment 91. The rod 103 is detachably secured to a tension link 105, which connects with a hook 107, which is connected to the movable ends of the lever 33, so that the movement imparted to the said levers by the deposition of a weight on the platform 13 will draw the rod 103 downwardly in the casing. The upper end of the rod 103 is pivotally connected to a hook 109, which is suspended by means of the power springs 111 to one end of a lever member 113. This lever member is pivoted as at 115 to the underside of the partition 87 and has an arm provided with ears 117 to which the upper ends of the power springs 111 are connected.

The lever member 113 has a second arm 119 extending beneath the partition 87 and provided with an adjustable set screw 121. It will thus be seen that the rod 103 is resiliently attached to the frame of the casing through the medium of the power springs 111 which are extended by the deposition of the weight on the scale platform and it is the deflection of these springs, which indicates the weight of the object on the scale platform. This deflection is measured in terms of the movement of the hook 109. This deflection is indicated visually on a shiftable indicating device contained in the chamber 89 immediately beneath the peep hole 67, the shiftable indicating means being calibrated with a scale which may be graduated in any suitable or convenient units.

In the illustrated embodiment, the weight indicating mechanism comprises a rotatable member 123 having a peripheral portion 125, which is adapted to be rotated beneath the peep hole 67. The peripheral portion 125 is preferably formed of translucent material, such as celluloid, and has scale forming indicia 127 arranged on the surface thereof remote from the peep hole so that, under normal conditions, when the scale carrying portion 125 is viewed through the peep hole, the scale forming indicia will be invisible through the translucent material forming the peripheral portion 125.

In order to permit a reading of the weight indicating device to be made, a source of light, which may be an incandescent electric lamp 129, is mounted in the casing immediately below that portion of the scale carrying member 125, which is visible through the peep hole 67 so that when the lamp is illuminated, the indicia formed on the inner surface thereof, will be rendered visible through the translucent material 125. In order to intensify and concentrate the vision of an observer upon the illuminated portion of the dial, and to permit a similar light to be used in illuminating the shiftable dial, a perforated screen 131 is arranged in the casing with the perforation 133 immediately above that portion of the dial which is to be observed. This screen has the additional effect of excluding any external light which may enter the casing through the peep hole and lens from illuminating the dial itself and thus assists in rendering the device inoperative when the lamp 129 is not in operation.

Although it is obvious that any suitable or convenient form of weight indicating mechanism may be employed with the other novel features of the device hereinbefore and hereinafter described, I prefer to employ a suitable dial having scale carrying portions progressively disposable beneath the opening 113. This dial preferably is in the form of a wheel or spider 135, which may be formed as a sheet metal disk mounted on a hub 137, which in turn is carried on a shaft 139 mounted for rotation on bearings 141 formed in the casing 61. The peripheral portions of the web 135 are provided with a slotted flange 143 in which is received the edge of an annular strip, which forms the shiftable dial member 125 and on which the indicia 127 is formed. The strip 125 is, as aforesaid, preferably formed of a translucent material, such as celluloid and the indicia, forming the lower register of the scale, is preferably formed on the outer surface of the strip as indicated at 127', while the remaining portions of the scale are arranged on the inner edge of the strip as indicated in dotted lines in Figure 8 of the drawings. This construction permits the lower portions of the scale portion to be viewed whether or not the lamp 129 is lighted so that the weight of articles having weight falling within the register 127' may be determined without actuating the lamp 129, which, as will hereinafter be described, is preferably controlled by the deposition of a coin or token through the slot 71, although other control means may, of course, be employed. Heavier weights in the upper register of the scale, however, cannot be determined without causing the illumination of the lamp 192.

The spider 135 and the dial 127 supported thereby may be rotated in response to the downward movement of the yoke 109 by means of a rack member 145, which has a toothed connection with a gear 147 formed in, or on, the shaft 139. The rack member 145 is connected on the yoke 109 through a shockless drive connection 149, which will hereinafter be more fully described, in such a way that the depression of the yoke 109 upon the deposition of a weight on the scale platform 113, will result in a rotation of the axle 139 and the dial 125 carried thereon through a predetermined distance and the scale formed in the member 125 is calibrated with respect to the resilience of the power spring 111 to register the correct weight.

The shockless drive connection 149 is a device to prevent jolts and jars, such as might be imparted to the drive rod 103 by suddenly dropping or otherwise depositing a substantial weight on the platform 113, from reaching the relatively delicate weight registering and disclosing mechanism 145, 147, 139, 135 and 125. The yoke 109 carries a rocker member 151 pivoted thereon between ears 153 formed on the yoke. The yoke also carries spring pressed pins 155 and 157, each normally urging the rocker member 151 in opposite directions about its pivot. The spring urging the pin 157 is slightly more powerful than that urging the pin 155 so that the rocker member is normally urged to rotate in a counter-clockwise direction, viewing Figures 5 and 6. The yoke, however, is at all times resiliently supported and the urge imparted by the springs in the pins 155 and 157 is to normally press the rack 145, which is carried by the rocker member 151 resiliently down in the gear 147.

The rocker member 151 carries a shaft 159 which telescopes into a sleeve 161, which in turn carries the rack member 145. The bottom of the sleeve 161 is provided with a block of rubber or other similar resilient material 163 so that when the sleeve reaches its lowermost position on the member 159, the jolt or jar will be absorbed by the rubber block. The member 159 is of non-circular cross-sectional configuration as is also the bore of the sleeve 161 so that relative rotation of these parts is prevented.

A spring 165 encircles the telescoping members 159 and 161, which tends to maintain them in a predetermined relative extended position. If, however, the yoke 109 is suddenly moved upwardly, or downwardly, the jar will not be imparted directly to the relatively delicate weight indicating parts of the mechanism, since the spring 165 will yield and permit the member 169 to move relatively with respect to the sleeve 161. Eventually, however, the spring will return to its normal position and will cause the weight indicating parts to gradually assume the weight indicating position corresponding to the weight supported on the platform. The resilient shockless drive, of course, does not form an essential feature of the invention but various other drive connections may be employed. The spring may be eliminated entirely, telescoping parts may be reversed and the squared bar 159 mounted on the rack 145 while the sleeve 161 is carried by the yoke 151. Where such a reversal is employed, it is desirable to make the fit between sleeve and bar quite snug and to make the sleeve and rack quite heavy to urge the parts normally downward. In this modified construction, the sleeve is provided at its bottom with a non-resilient stop which is accurately fitted to receive and support the end of the bar in true weight indicating position and to stop the bar and attached rack in the proper weight indicating position when the yoke is lowered in response to a weight on the platform. The parts, however, are non-positively connected so that vibration, such as is caused by the jumping of a person on the scale, is not necessarily passed to the delicate parts since the bar will slide in the sleeve if the weighing mechanism is violently agitated.

In order to control the light 129, the illumination of which conditions the apparatus to disclose the weight carried on the platform, I provide an electric circuit as shown in Figure 10, including a normally open switch 167, which is adapted to close and complete a lamp operating circuit when the switch operating lever 95 receives a coin 169 as hereinbefore described. The lamp operating circuit includes a battery 171 and a connection 173 leading from one pole of the battery to ground. The other pole of the battery is connected with the switch 167 whence the connection travels a solenoid 175 and the lamp 129 in series and is then connected to ground to complete the circuit. The solenoid 175 also actuates a holding switch 177, which is connected in parallel with the switch 167. When the switch 167 is closed, the circuit is completed through the solenoid and the lamp 129 with the result that the lamp is illuminated. The switch 167 is operated by the lever 95 which moves from the position illustrated in full lines in Figure 5 of the drawings into the position illustrated in dotted lines under pressure of the coin. When the lever reaches the position illustrated in dotted lines, the coin will roll off of the lever and down into the chute and into the coin receptacle, after which the lever will return to its normal position. The switch 167 will then open but during the short period that it has been closed the solenoid 165 will have drawn the switch 177 to closed position so that the power circuit for illuminating the lamp 129 will be maintained.

The lamp actuating circuit also includes a switch 187, which is preferably inserted in the ground connection 173, but which, of course, may be arranged in any convenient location in the circuit. This switch 187 is operated by a means including an arm 179 carried on the rod 103 in such a way as to cause the switch 187 to close, as soon as the rod 103 moves downwardly under the influence of a weight imposed on the weighing platform 13 so that it is necessary not only to deposit the coin 169 and thus operate the switch 167, but also to have a weight on the platform before the light operating circuit is completed.

In order to prevent the coin from passing through the apparatus and permitting the switch 187 to close and open before the circuit is completed at the switch 187, as for instance, if a coin is dropped in the machine before the article to be weighed is placed upon the platform, the lever 95 is provided with an arm 181 which extends in substantial parallelism above the shaft 139. The shaft 139 also carries a finger 183 which, when there is no weight, or a very slight weight, upon the scale platform, is disposed immediately beneath the arm 181 in such a way as to prevent the lever 95 from tipping in the position illustrated in dotted lines in Figure 5 of the drawings. In this manner, the lever 95 is propped in a position such that the coin 169 cannot pass through the mechanism. As soon as a weight is placed on the platform, however, the dial shaft 139 will be rotated so as to bring the finger 183 out from beneath the arm 181 so that the lever 95 may rotate in a counter-clockwise direction, viewing Figure 5, close the switch 167 and energize the solenoid 175 and the lamp 129, it being remembered that as soon as a weight is placed on the platform, the switch 187 will be closed.

I have also provided a means for preventing the use of the scale to furnish two "weighs" for the price of one. This is accomplished by forming the switch 187 with an elongated prong 185 and forming the switch actuating finger 179 as an arm of a T-shaped member 189, which is pivoted at 188 on the rod 103, one side 191 of the bar of the T-shaped member being made substantially heavier than the other side 193 so that the arm 179 is normally rotated in a clockwise direction, viewing Figures 5 and 6, in order to bring the toothed edge 195 on said arm into contact with the extended arm 185 of the switch 187. As the rod 103 moves downwardly, the extended portion 185 of the switch will engage the toothed edge 195 of the arm 189 and will be moved downwardly to effect the closing of the switch 187. If after one "weigh" is obtained by operating the weighing mechanism properly and it is attempted to obtain a second "weigh" by positioning a second item on the weighing platform and then removing the first item, which is known to be a common practice with device of this general class, the switch 187 will be maintained in closed position as the second weight is applied, but as soon as the first weighted article is removed, the rod 103 will move upwardly under the influence of the springs 111 and the engagement of the finger 185 in the ratchet formation on the arm 179 will carry said finger upwardly and open the switch which will immediately destroy the lamp illuminating power circuit so that the dial 125 will be rendered inoperative to disclose the weight of the second article.

My invention therefore provides a device which renders it extremely difficult to manipulate the weighing machine in order to surreptitiously obtain a second "weigh" for the price of one. In order to release the switch arm 185 from the toothed surface of the arm 179 as the mechanism returns to the zero position, I have arranged the finger 197 in the path of the lighter arm 193 of the T-shaped member 189 so that, as the mechanism reaches zero position, the arm 193 will be engaged by the finger 197 and the member 189 rotated in a counter-clockwise direction, viewing Figures 5 and 6, so as to release the finger 185, which, being of resilient material, will snap downwardly to normal position ready to repeat its function in the cycle of operation of the device.

Instead of arranging the translucent scale dial as shown in Figures 7 and 8 of the drawings wherein that portion which carries the weighing calibrations is arranged in parallel to the axis of rotation, I may provide a scale dial wherein the translucent calibrated portion is disposed at an angle to the axis of rotation. This form would include either a substantially flat plate-like element carrying the weighing calibrations adjacent its periphery or would include any type of conically arranged, calibrated surface adapted to move angularly about an axis of turning. In all of these constructions, I would associate therewith a sight aperture of restricted size and which is adapted to view a restricted field of the calibration passing thereunder and would provide an illuminating means disposed behind the calibrated surface. By this arrangement a single lighting means of relatively small wattage may be used to brilliantly illuminate only that field that comes opposite the sight aperture.

It is thought that the invention and numerous of its attendant advantages will be understood from the foregoing description and it is obvious that numerous changes may be made in the form, construction and arrangement of the several parts without departing from the spirit or scope of my invention or sacrificing any of its attendant advantages; the form herein described being a preferred embodiment for the purpose of illustrating my invention.

Having thus described my invention, what I claim as new and desire to secure by Letters Patent is as follows:

1. A weighing scale comprising the combination of a translucent dial with a scale formed on one of its surfaces and normally invisible through said dial, and means operable, as an incident to the weighing operation, to illuminate said dial so that the normally invisible scale may be seen through the material of the dial, said dial having a visible scale portion formed on other portions of the dial to indicate weight without requiring the operation of the dial illuminating means.

2. A weighing scale, as set forth in claim 1, wherein the visible scale portions are arranged to indicate weights within a definite range within the capacity of the scale while the normally invisible scale portions, when rendered visible, are adapted to indicate weights outside of the range covered by the visible scale portions of the dial.

3. A weighing scale, as set forth in claim 1, wherein the visible scale portions are adapted to indicate weights from the zero scale reading up to a predetermined maximum, while the normally invisible scale portions, when rendered visible, are adapted to indicate weights above said predetermined maximum of the visible scale portions.

4. A weighing scale, as set forth in claim 1, wherein the normally visible and normally invisible scale portions are arranged so that the weight of a person cannot be determined without conditioning the scale to render the normally invisible scale portions visible.

5. A weighing scale comprising the combination of a translucent dial with a normally invisible scale formed on one of its surfaces and means operable, as an incident to the weighing operation, to illuminate said dial so that the scale may be seen, said dial having a visible scale portion formed on other portions of the dial to indicate weight without requiring the operation of the dial illuminating means, the scale dial being formed as a curved strip mounted cylindrically for rotation about an axis in response to the application, on the scale, of a weight to be measured, and the normally invisible scale being formed on the concave surface of the dial.

6. A weighing machine comprising a weighing mechanism shiftable in response to the weight to be measured, a weight indicator normally incapable of indicating the weight and conditioning means to render the indicator capable of disclosing the indicated weight, and an electrical circuit for operating the conditioning means, said circuit including a switch, co-operating means on said switch and said weighing mechanism whereby the former is closed when a weight to be measured is applied to the machine, additional switching means comprising a second switch in said circuit, which may be instantaneously closed and opened by the passage of a coin in the machine, said switching means being biased toward open position, circuit maintaining means co-operatively associated in said circuit whereby to maintain the circuit after said switching means has opened following the passage of a coin or token through the machine and means co-operatively associated with said weighing mechanism for breaking the circuit as soon as the weight, being measured in the machine, is reduced.

7. A weighing machine including a normally inoperative weight indicating mechanism comprising a pair of members relatively shiftable in response to the disposition of weights in the machine, one of said members, at least, carrying a scale for measuring the deposited weight, conditioning means operable in response to the deposition of a weight to be measured to condition the indicating means for the performance of its weight indicating function, and coin-controlled means to actuate the conditioned indicating means, and means cooperating with the coin-controlled means to prevent the same from operating until the conditioning means has been operated by the disposition of a weight in the machine.

8. A weighing machine as set forth in claim 7, wherein the weight indicating means is normally invisible and hence inoperative to perform its weight indicating function, and wherein the conditioning means comprises means operable to make the indicating means ready to be rendered visible in response to the actuation of the coin control means by a coin or token.

9. A weighing machine as set forth in claim 7, including means to render the conditioning means inoperative in the performance of its weight indicating function as soon as the amount of the weight deposited in the machine is decreased, as when an attempt is made to weigh a plurality of items during a single operating cycle of the machine.

10. A weighing machine including normally invisible weight indicating means, illuminating means operable to render the indicating means visible, a control circuit for said illuminating means, conditioning means for rendering the circuit operable to actuate the illuminating means, said conditioning means including a control device actuated in response to the deposition of a weight to be measured in the weighing machine, a coin or token responsive device operable in response to the deposition of a coin or token in the weighing machine, and means to prevent operation of the coin or token responsive device prior to the deposition of the weight to be measured in the weighing machine.

11. A weighing machine as set forth in claim 10, wherein the control device is adapted to render the illuminating device inoperative and the indicating means consequently invisible as soon as the weight being measured in the machine is decreased.

12. A weighing machine including normally invisible weight indicating means, illuminating means operable to render the indicating means visible, control circuit means for said illuminating means, conditioning means for rendering the circuit operable to actuate the illuminating means, said conditioning means including a normally open switch in said circuit, connections for closing said switch when a weight to be measured is deposited in the weighing machine, a second normally open switch adapted to be closed in response to the deposition of a coin in the weighing machine, and means to prevent the closure of the second switch in advance of the closure of the first.

13. A weighing machine including normally invisible weight indicating means, illuminating means operable to render the indicating means visible, control circuit means for said illuminating means, conditioning means for rendering the circuit operable to actuate the illuminating means, said conditioning means including a normally open switch in said circuit, connections for closing said switch when a weight to be measured is deposited in the weighing machine, a second normally open switch adapted to be closed in response to the deposition of a coin in the weighing machine, and a circuit maintaining switch arranged in said circuit to operate in conjunction with the coin actuating switch in order to maintain the circuit after the coin operated switch opens following the passage of the actuating coin past switch-actuating position.

14. A weighing machine including, in combination, weight indicating means, an illuminating device for illuminating the indicating means, a circuit for actuating the illuminating means, said circuit including in series therein a coin-actuated switch, and a switch actuated in response to the deposition of a weight to be measured in said weighing machine, whereby the circuit is rendered operative to actuate the illuminating means only when both switches are closed at the same time, said coin-controlled switch being normally inoperative until the weight to be measured is applied to the weighing machine.

15. A weighing machine including, in combination, weight indicating means, an illuminating device for illuminating the indicating means, a circuit for actuating the illuminating means, said circuit including, in series therein, a coin-actuated switch, and a switch actuated in response to the deposition of a weight to be measured in said weighing machine whereby the circuit is rendered operative to actuate the illuminating means only when both switches are closed at the same time, and circuit-maintaining means associated with the coin-actuated switch in order to maintain the circuit in operation after the coin-actuated switch opens.

16. A weighing machine including, in combination, weight indicating means, an illuminating device for illuminating the indicating means, a circuit for actuating the illuminating means, said circuit including, in series therein, a coin-actuated switch, and a switch actuated in response to the deposition of a weight to be measured in said weighing machine, whereby the circuit is rendered operative to actuate the illuminating means only when both switches are closed at the same time, said weight-responsive switch being operable to open the circuit whenever the weight being measured is decreased whereby to render the illuminating means inactive whenever the weight being measured is reduced as when an attempt is made to weigh two items on the scale during a single operating cycle of the machine.

17. A weighing machine comprising a casing forming a chamber having a restricted peep-hole, weight indicating means in said casing and normally invisible through said peep-hole, means to illuminate the weight indicating means to render the same visible through said peep-hole, a control circuit for said illuminating means, conditioning means for rendering the circuit operative to actuate the illuminating means, said conditioning means including a control device actuated in response to the deposition of a weight to be measured in the weighing machine, and a device operable only after the deposition of a weight and in response to the deposition of a coin or token in the weighing machine.

18. A weighing machine comprising weight-indicating means including a weight-measuring member shiftable in response to the application to the machine of weights to be measured, said means being normally inoperative to indicate the weight measured by the member, means comprising an actuating circuit, including control switches, for rendering the indicating means operable to indicate the weight measured when said control switches are closed to complete the circuit, and means to close the switches, one in response to the deposition in the machine of a weight to be measured and another operable only after the deposition of a weight and in response to the deposition of a coin or token whereby to render the indicating means operative.

19. A weighing machine comprising a weighing mechanism shiftable in response to the weight to be measured, a weight indicator normally incapable of indicating the weight, and conditioning means to render the indicator capable of disclosing the indicated weight, said conditioning means comprising a control actuated in response to the movement of at least a part of the weighing mechanism when the weight to be measured is applied to the machine, said control being operable, as soon as the weight in the machine is decreased, to discontinue the actuation of the conditioning means.

MATHIAS J. WEBER.